US005907646A

United States Patent [19]
Kitamura

[11] Patent Number: 5,907,646
[45] Date of Patent: May 25, 1999

[54] OPTICAL COUPLING CIRCUIT AND FABRICATION PROCESS THEREFOR

[75] Inventor: Naoki Kitamura, Tokyo, Japan

[73] Assignee: NEC Corporation, Japan

[21] Appl. No.: 08/851,679

[22] Filed: May 6, 1997

[30] Foreign Application Priority Data

May 14, 1996 [JP] Japan .................... 8-118645

[51] Int. Cl.[6] .................................................. G02B 6/10
[52] U.S. Cl. ..................... 385/14; 385/131; 385/132; 385/147
[58] Field of Search ............................ 385/14, 147, 49, 385/131, 132

[56] References Cited

U.S. PATENT DOCUMENTS

| 4,750,799 | 6/1988 | Kawachi et al. ............. 350/96.11 |
| 5,488,678 | 1/1996 | Taneya et al. ................... 385/14 |

FOREIGN PATENT DOCUMENTS

| 0716321 | 6/1996 | European Pat. Off. .......... G02B 6/13 |
| 736949 | 2/1975 | Japan . | |
| 5100122 | 4/1993 | Japan ............................. G02B 6/12 |
| 6201930 | 7/1994 | Japan ............................. G02B 6/12 |

OTHER PUBLICATIONS

Hybrid Integration of Semiconductor Lasers with Si–Based Single–Mode ridge Waveguides: Friedrich et al 8217 Journal of Lightwave Technology 10 (1992) Mar., No. 3, New York, US; pp. 336–340.

"Design of Tapered Semiconductor Waveguide for Transforming Mode–Size" Mitomi et al The Institute of Electronics, Information and Communication Engineers, Electronics Societey Conf. SC–1–2; 1995; pp. 311–312.

"A WDM optical transmitter/receiver module configuration using a PLC platform" Yamada et al The Institute of Electronics, Information and Communication Engineers, Electronics Society Conf. SC–1–11; 1995; pp. 329–330.

"Planar Lightwave Circuit Platform with Coplanar Waveguide for Opto–Electronic Hybrid Integration" Mino et al Journal of Lightwave Technology, vol. 13, No. 12, Dec. 1995; pp. 2320–2325.

*Primary Examiner*—Hung N. Ngo
*Attorney, Agent, or Firm*—Hayes, Soloway, Hennessey, Grossman & Hage, P.C.

[57] ABSTRACT

An optical coupling circuit includes an optical waveguide having an optical waveguide forming layer having a lower clad layer, a core layer and an upper clad layer. An optical element is mounted on an optical element mounting portion formed by removing a portion of the optical waveguide forming layer. The optical coupling circuit optically couples an end face of the exposed thin waveguide and the optical element mounted on the optical element mounting portion. In such optical coupling circuit, at least one thin film is inserted in the optical waveguide forming layer, and, in the thin film, there is a part of said thin film removed at said optical element mounting portion. Mass-production of the optical coupling circuit and simplification of the fabrication process can be achieved. A reference plane in the height direction is stably formed in the wafer, and heat radiation or removing of the light emitting element can be performed.

5 Claims, 3 Drawing Sheets

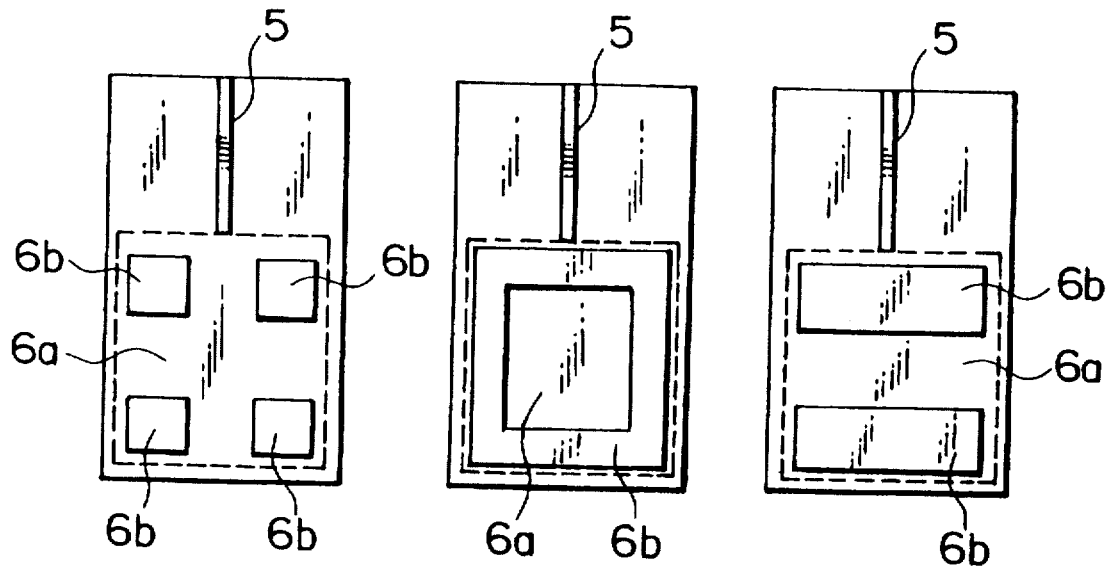
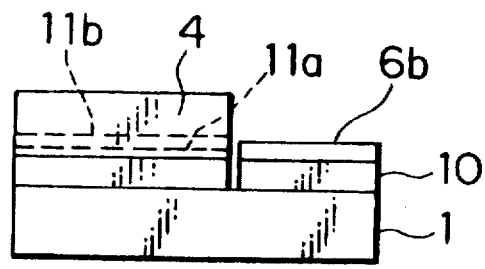
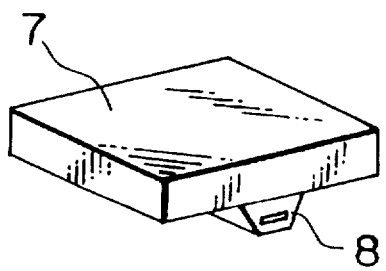
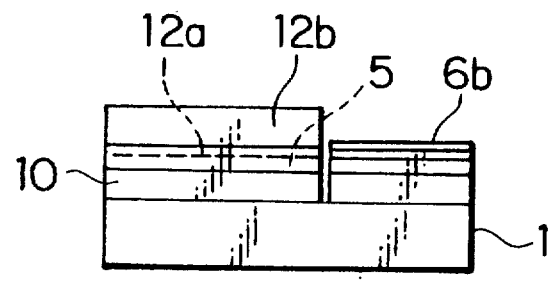

OPTICAL COUPLING CIRCUIT AND FABRICATION PROCESS THEREFOR

BACKGROUND OF THE INVENTION

1. Field of the Invention

The present invention relates generally to an optical coupling circuit for optically coupling an optical waveguide having an optical waveguide forming layer having a lower clad layer, a core layer and an upper clad layer and an optical element mounted on an optical element mounting portion formed by removing a part of the optical wave guide forming layer, and a fabrication process therefor. More specifically, the invention relates to an optical coupling circuit which couples an optical waveguide and a light emitting element, a light sensing element, an optical function element, or the like, and a fabrication process therefor.

2. Description of the Related Art

In general, devices employing an optical waveguide functions not only for transmitting a light beam, but also for distributing an optical power and for synthesizing and dividing wavelength of the light. Therefore, such devices are an component in an optical communication system. However, for application in optical communication, it is not only required to optically couple an optical waveguide of an optical device with an optical fiber, but also to optically couple the optical waveguide with an optical element, such as a light emitting element, a light sensing element, or the like.

Currently, optical communications systems have proposed an fiber network as replacement for a subscriber network, in which electric signal cable in the current subscriber network is replaced with an optical fiber. Accordingly, it is required to extend the optical fiber to each subscriber terminal and to optically couple the optical wave guide, the light emitting element and the light sensing element with the optical fiber line. For this purpose, it is essential to adapt the optical device for mass-production and, of course, to lower cost. In order to realize this, the optical device needs to be down-sized by reducing the number of parts to be assembled, and reducing the number steps for process steps in fabrication. Among these tasks, in the optical coupling of the optical fiber with the light emitting element, a precision typically less than or equal to 1 $\mu$m is required. Therefore, such devices are inherently labor intensive. This is the most important impediment for mass-production and lowering of fabrication cost.

The inventors have already proposed a coupling method of an optical waveguide and an optical fiber (Japanese Unexamined Patent Publication (Kokai) No. Heisei 7-36949). In the proposed coupling method, adjustment-free and high precision optical coupling can be performed without complicated processes by forming a V-shaped groove on a waveguide substrate and setting the optical fiber using the V-shaped groove as a guide. However, concerning optical coupling of the light emitting element with the optical fiber or the optical waveguide, since a mode field of the light emitting element is different from those of the optical filer or the optical waveguide, merely less than or equal to one tenth of coupling efficiency can be obtained if the light emitting element with the optical fiber or the optical waveguide are coupled directly. For improving the a coupling efficiency, prior art methods propose inserting a lens between the light emitting element and the optical fiber or the optical waveguide to spatially establish optical coupling, other methods propose processing the tip end of the optical fiber into a hemisphere shaped configuration to provide a lens effect. Furthermore, in these method, since the lens is used, allowable tolerances in alignment error become very small, thereby making it difficult to establish optical coupling in an adjustment-free manner.

However, in the recent years, there has been developed light emitting element having a mode field close to those of the optical fiber and the optical waveguide (for example, Mitomi et al. The Institute of Electronics, Information and Communication Engineers, Electronics Society Conference SC-1-2, 1995) to have about 1 to 2 dB of coupling efficiency and a relatively wide allowable alignment error value of about ±1 to 2 $\mu$m. In addition, there has been developed a device having a structure in which the optical waveguide and the improved light emitting element are coupled directly each other see, e.g., (Yamada et al. The Institute of Electronics, Information and Communication Engineers, Electronics Society Conference SC-1-11, 1995).

Also, an attempt has been made to perform optical coupling between the light emitting element and the optical waveguide (E. Friedrich et al., Journal of Lightwave Tech., Vol. 10, No. 3, pp. 336–339, 1992). The point of the foregoing technology will be described hereinafter. A plane, to be a reference with respect to the height direction, is required in order to optically couple the optical waveguide and the light emitting element with high precision. In general, upon forming the optical waveguide, by surrounding the circumference of a core layer by a clad layer, absorption of the guided wave by the substrate is prevented and control of the refraction index becomes possible. The distance from the center of the waveguide passage to the surface of the substrate, namely the thickness of the lower clad layer, is required to be greater than or equal to 10 $\mu$m. However, the position of an active layer (to be an optical center of a semiconductor laser) employed as the light emitting element is generally 2 to 3 $\mu$m from the surface of the element. When the light emitting element is directly mounted on the substrate, coupling cannot be established at all. Therefore, it is necessary to provide a reference plane in the height direction of both of the light emitting element and the optical waveguide. In the method of Yamada et al., unevenness (recess and protrusion) is preliminarily formed on the surface of the substrate. After forming the lower clad layer on the substrate, planarization is performed by polishing the surface of the lower clad layer to expose the protruding portion of the substrate. Thus, a light emitting element mounting portion is provided on the exposed portion of the substrate and a waveguide forming portion is provided at the recessed portion of the substrate where the lower clad layer remains. In this method, since the light emitting element mounting portion is formed at the last step upon removing the waveguide forming layer located thereon, the substrate surface serves as an etching stop layer. Namely, the surface polished and planarized in the preceding step serves as the reference plane in coupling of the optical waveguide and the light emitting element. Furthermore, the exposed substrate surface serves as a heat sink for the light emitting element upon mounting the light emitting element.

On the other hand, in the method of E. Friedrich et al, upon removing the waveguide forming layer at the light emitting mounting portion, etching of part of the mounting portion is stopped at a position where the height of the optical waveguide and the light emitting element becomes optimal. By taking this surface as the reference plane, the optimal coupling between the light emitting element and the optical waveguide can be realized.

Also, in Japanese Unexamined Patent Publication No. Heisei 5-100122 by Okamura et al., a thin film layer is formed in the vicinity of the core layer. The upper surface of the thin film layer is exposed as the reference plane. By tightly fitting this reference plane with the reference plane of the guide member supporting the optical element, coupling of the optical element and the optical waveguide is established.

However, the above-mentioned prior art encounters the following problems. Namely, in the method of Yamada et al, the exposed surface of the substrate is taken as the reference plane in the height direction of the optical waveguide and the light emitting element. Therefore, high precision alignment becomes possible only when, polishing is in performed the fabrication process in order to provide the reference plane. This makes the process complicated, and therefore, unfit for mass-production. In case of these devices mass-production of these devices, it is ideal to perform fabrication only by steps of layer formation, patterning, etching and so forth in batch process (as in the semiconductor LSI process).

On the other hand, by the method of E. Friedrich et al., in order to obtain high precision alignment, etching must be stopped at the optimal position. Therefore, it is necessary for precision control of the etching speed of the etching device. Particularly, in mass-production, since a large number of optical coupling circuits are formed on one wafer, it is necessary to accurately control distribution of etching speed in the wafer and distribution of layer thickness of waveguide forming layer to be etched. These problems are quite difficult to solve. Therefore, it is not practical to mass-produce the device employing this method.

Also, in the method of Okamura et al,. since a guide member is required for the optical element to be coupled with the optical waveguide, the number of necessary parts becomes large. Furthermore, when the optical element is directly mounted on the substrate employing this method, since an under-clad is present between the substrate and the mounting position, while it is effective for coupling the element not causing heat, such as the optical fiber, the light sensing element and the like and the optical waveguide, it is not effective for coupling the light emitting element which generates a heat, as sufficient heat radiation cannot be performed.

In order to enable mass-production of the optical coupling circuit for the optical waveguide and the light emitting element toward the future, it is essential to enable fabrication process, to stably form the reference plane in the height direction in the wafer, and to permit sufficient heat radiation of the light emitting element.

SUMMARY OF THE INVENTION

It is therefore an object of the present invention to provide an optical coupling circuit and a fabrication process thereof, which can stably form a reference plane in a height direction in a wafer and can perform sufficient heat radiation of a light emitting element.

Another object of the present invention is to provide an optical coupling circuit which can be fabricated by a series of simple process steps for mass-production.

An optical coupling circuit for optically coupling an optical element according to the present invention comprises an optical waveguide formed by patterning an optical waveguide forming layer having a lower clad layer, a core layer and an upper clad layer; an optical element mounting portion formed by removing a part of said optical waveguide forming layer; and at least one thin film inserted in said optical waveguide forming layer, a part of said thin film being removed at said optical element mounting portion.

A fabrication process of an optical coupling circuit for optically coupling an optical element according to the present invention comprises the steps of: forming an optical waveguide forming layer having a lower clad layer, a core layer and an upper clad layer, with inserting at least one thin film in said optical waveguide forming layer and removing a part of said thin film at an optical element mounting portion; removing a part of said optical waveguide forming layer at said optical element mounting portion to constitute an optical waveguide and said optical element mounting portion and expose the surface of said thin film; and exposing a part of the surface of the substrate where said thin film is removed.

According to the present invention, it is not necessary to precisely control the etching rate and the layer thickness distribution with the mask of the optical element mounting portion. Namely, even when the mask is exposed by etching, by employing a layer having a low etching rate relative to the waveguide forming layer as a masking material, the reference plane in the height direction can be stably formed. Furthermore, since a part of the mask of the optical element mounting portion can be removed, the waveguide forming layer at this portion is removed to expose the substrate. Accordingly, the exposed substrate surface and the optical element are contacted via a material having high electrical or thermal conductivity, and can be formed as a heat sink. Thus, it is only required to insert the thin film between the optical waveguide forming layers. As a result, it becomes possible to form the device in normal layer deposition and patterning process, and thus is optimal for mass-production.

BRIEF DESCRIPTION OF THE DRAWINGS

It will be appreciated by those skilled in the art that although the following Detailed Description will proceed with reference being made to preferred embodiments, the present invention is not intended to be limited to these preferred embodiments. Other features and advantages of the present invention will become apparent as the following Detailed Description proceeds, and upon reference to the Drawings, wherein like numerals depict like parts, and wherein:

FIGS. 4A to 4C are plan view of the optical coupling circuit of the second to fourth embodiments according to the present invention;

FIG. 5 is a section of the optical coupling circuit of the fifth embodiment according to the invention; and FIGS. 6A and 6B are perspective and section views, respectively, showing an optical coupling circuit of the sixth embodiment according to the present invention.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be apparent, however, to those skilled in the art that the present invention may be practiced without these specific details. In other instance, well-known structures are not shown in detail in order to avoid unnecessary obstruction of the present invention.

Figure 1A:
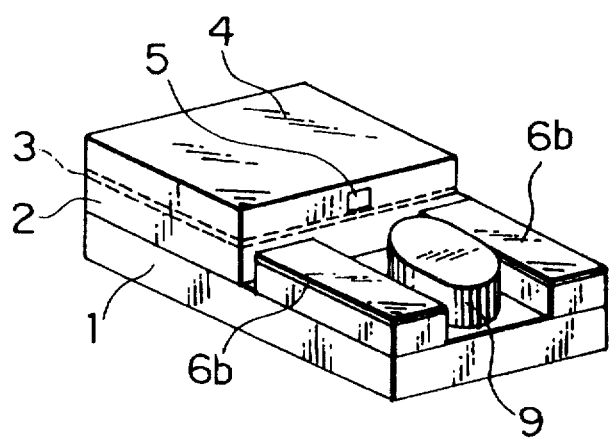
FIGS. 1A and 1B are perspective view and section views respective showing an optical element of an optical coupling circuit of the first embodiment according to the present invention, in a condition before mounting.
Figure 1B:
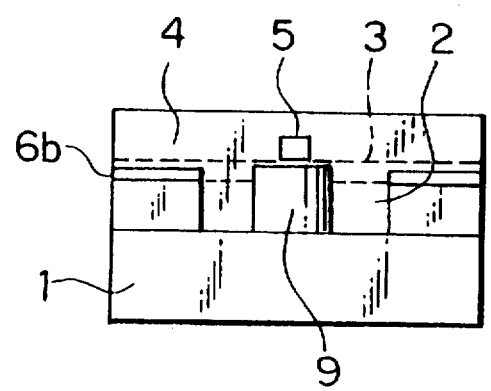
Figure 2A:
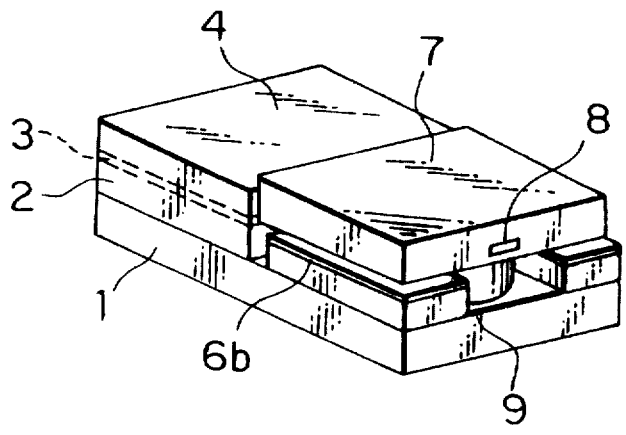
FIGS. 2A and 2B are respective perspective view and section showing an optical element of an optical coupling circuit of the first embodiment according to the present invention, in a condition after mounting the optical element.
Figure 2B:
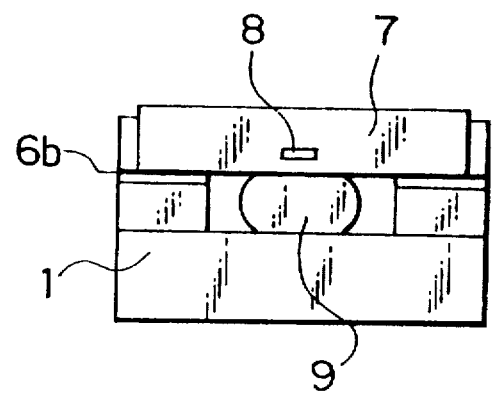

Figs. 1A and 1B are perspective and section views, respective showing an optical element of an optical coupling circuit of the first embodiment according to the present invention, in a condition before mounting, FIGS. 2A and 2B are perspective and section views, respectively, showing an optical element of an optical coupling circuit of the first embodiment according to the present invention, in a condition after mounting, and FIGS. 3A to 3E are perspective views showing a fabrication steps of the optical coupling circuit of the first embodiment according to the invention, in sequential order.

Figure 3A:
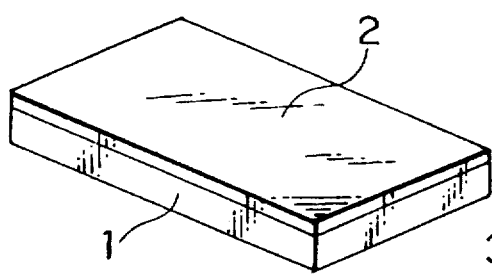
FIGS. 3A to 3E are perspective views showing a fabrication process of the optical coupling circuit of the first embodiment according to the present invention in sequential order.
Figure 3B:
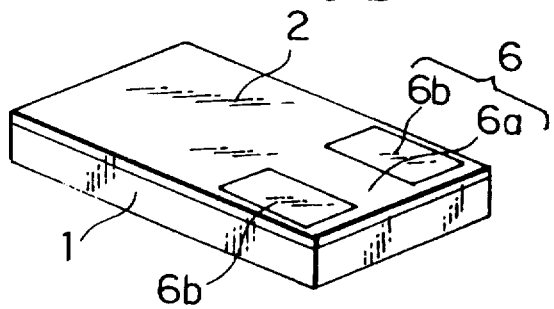

In order to form a mask for stopping the etching between lower clad layers in the shown embodiment, the lower clad layers are deposited through separate two disposition processes. At first, as shown in FIG. 3A, after deposition of a first lower clad layer 2 on a substrate 1, a thin film 6 to be a mask for stopping etching is locally formed at one end portion of the lower clad layer 2. Subsequently, in the optical element mounting portion, a central portion of the thin film 6 is removed. In FIG. 3B, an optical element mounting portion 6a where the thin film 6 is removed and a portion 6b where the thin film 6 remains, are illustrated.

Figure 3C:
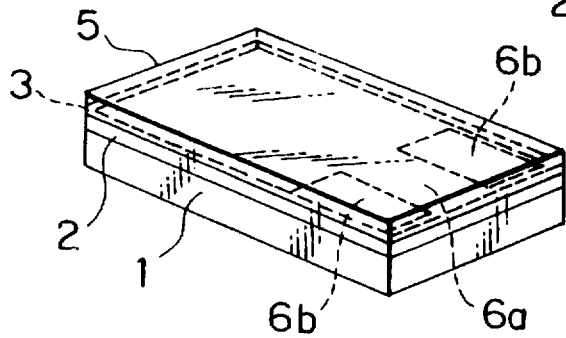

Subsequently, as shown in FIG. 3C, over the entire surface, a second lower clad layer 3 and a core layer 5 are formed sequentially. Here, in order to accurately determine the position in the height direction, it becomes necessary to determine a layer thickness to be preliminarily deposited. A distance from the surface of the optical element 7 (see FIGS. 2A and 2B) to be mounted, to the center of the active layer 8 to be the optical center is assumed to be d1, the layer thickness of the core layer 5 is assumed to be d2, then the necessary layer thickness of the second lower clad layer 3 is determined by (d1 −d2/2). As one example, assuming that the layer thickness d2 of the core layer 6 is 6 μm, a distance d1 from the surface of the optical element 7 to the center of an active layer 8 to be the optical center is 4 μm, a layer thickness required for the second lower clad layer 3 becomes 1 μm.

At this time, the layer thickness of the first lower clad layer 2, in combination with the second lower clad layer 3, is required to be sufficient to prevent absorption of a guided light by the substrate. High precision is not required of the layer thickness of the first lower clad layer 2. A height from the second lower clad layer 3 to the center of the core layer 5 is 4 μm, for example. Even when the fluctuation in the wafer surface in layer thickness in layer formation, is in the extent of ±10%, the fluctuation of the height becomes about ±0.4 μm. This is sufficiently high precision to perform high efficiency optical coupling.

Figure 3D:
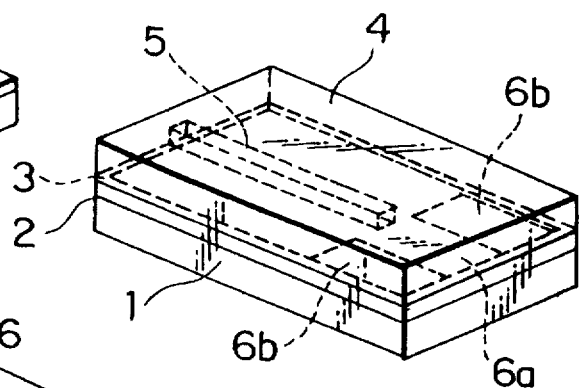

Next, as shown in FIG. 3D, the core layer 5 is etched to be patterned in a configuration of a waveguide. After performing etching, an upper clad layer 4 is deposited. It is unnecessary to ensure accurate layer thickness of the upper clad layer 4, if sufficiently large thickness is provided.

Figure 3E:
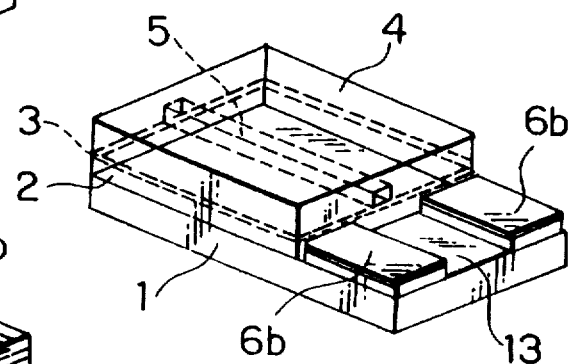

Thereafter, as shown in FIG. 3E, etching of the optical waveguide forming layer of the portion mounting the optical element 7 is performed.

At this time, etching of the portion 6a where the thin film 6 of the optical element mounting portion is removed, is progressed up to the surface 13 of the substrate. Etching is stopped when the surface 13 of the substrate is exposed. On the other hand, the portion 6b where the thin film 6 remains (as the optical element mounting portion), stops etching reaching thereto. Accordingly, the exposed surface 13 of the substrate is the reference plane in the height direction for mounting of the optical element. In order to mount the optical element on the surface of the portion 6b where the exposed thin film 6 remains, the position relationship between the portion 6a where the thin film 6 is removed in the optical element mounting portion and the portion 6b where the thin film 6 remains is established as in the second to fourth embodiment shown in FIGS. 4A, 4B and 4C, to make it possible to stably mount the optical element.

FIG. 4A shows the second embodiment, in which the portions 6b where the thin film 6 remains, are formed at four corners in a forming region of the thin film 6. FIG. 4B shows the third embodiment, in which the portions 6b where the thin film 6 remains, are formed along four edges in a manner surrounding the portion 6a where the thin film 6 is removed. In FIG. 4C, a pair of portions 6b where the thin film 6 remains, are located in opposition across the portion 6a where the thin film 6 is removed.

In FIG. 3E, upon performing etching, it is desirable to simplify the process by simultaneously forming the optical element 7 and the end surface portion of the waveguide to be optically coupled thereto. The end surface portion of the waveguide is required to have sufficient flatness and verticality for obtaining good coupling efficiency. Therefore, it is desirable to form the end surface dry etching, such as reactive ion etching (RIE), an ion beam etching (IBE), or a reactive ion beam etching (RIBE). It is also possible to perform wet etching instead of dry etching, and subsequently curve a groove on the end face portion by a mechanical process, such as that employing dicing saw or so forth.

As pointed out in the description of the prior art, a semiconductor laser employed as light emitting element, generates copious heat. Therefore, it is necessary to make contact with a heat sink having large thermal capacity to remove the heat of the semiconductor layer. As the material for the heat sink, Si, BN, and the like may be used. However, it is preferred to use Si which is typically used as a material of the substrate.

In the shown embodiment, by providing the portion 6a where the thin film 6 is removed, the Si substrate exposed at this portion contacts the mounted optical element via a material having generally high thermal conductivity, to enable heat dissipation of the optical element. Preferably, a material having high thermal conductivity, high electric conductivity and mechanical bonding is used such as AuSn solder, as or the like. On the exposed surface portion of the substrate, a solder bump 9 having sufficient thickness is formed with AuSn solder. Then, by contacting the optical element 7 with the solder bump 9, sufficient heat radiation effect through the solder bump can be attained. Here, alignment in the height direction is accomplished by using the portion 6b as the etching stopping mask. Therefore, high accuracy alignment can be maintained irrespective of the height of the solder bump.

Here, for the portion 6b serving as the etching stop mask, it is required that the portion 6b is negligibly etched even when etching of the first lower clad layer 2 is performed. In general, the layer thickness of the lower clad layer is required to be greater than or equal to 10 μm. Therefore, in order to achieve ±1 μm precision required for maintaining high precision alignment in the height direction, it is necessary that the thickness of the portion serving as the etching stopping mask to be less than or equal to 1 μm. Therefore, an etching rate ratio (generally called a selection ratio) between the portion to be the etching stopping mask and the lower clad layer has to be greater than or equal to 10. Preferably a metal such as polycrystalline Si, Cr, Au, Pt, and the like, or a silicide, such as WSi, MoSi, or the like, may be used. In addition to providing a high selection ratio, it is also required that the layer quality should not be degraded upon formation of the second clad layer, the core layer and the upper clad layer. Preferably, the material for forming the waveguide can include a quartz layer or $Si_3N_4$. The refraction index can be varied with by doping P, Ge, B, Ti, or the like. The quartz layer, which is preferably frequently used can be deposited by a normal pressure CVD method, a low pressure CVD method, a plasma CVD method or, a frame deposition method, or other methods known in the art. In order to prevent degradation of layer quality of the mask, it is preferable to form the quartz layer in a low temperature environment.

In the foregoing method, high precision. alignment in the height direction can be simply realized. For simple mounting of the optical element, it is desirable to perform alignment in the transverse direction (in plane direction of the substrate). To perform the alignment, the present invention provides an index alignment method employing an image recognition. This method enables precise alignment with the optical waveguide by image recognition of a marker provided on the substrate and on the optical element. By combining this method, upon performing optical coupling of the optical waveguide and the optical element, passive alignment can be realized by performing mounting without monitoring, and thus is optimal for mass-production.

It should be noted that while the foregoing embodiment has been discussed with respect to where the position of the surface of the optical element is located between the lower clad layers upon mounting. In the case where the position of the active layer of the optical element is located at a position further from the surface of the optical element, the surface of the optical element may located between the core layers upon mounting. In such case, as in the fifth embodiment shown in FIG. 5, the core layer 5 is formed on the lower clad layer 10 as a separately deposited first core layer 11a and a second core layer 11b, and between these, an etching stop mask 6b may be formed.

Alternatively, there is a case where the only a portion of the active layer 8 is bulged in trapezoidal form beyond the surface of the optical element 7, as in the sixth embodiment shown in FIG. 6A. In this case, the surface of the optical element may be located between the upper clad layers upon mounting. The upper clad layer 4 is deposited separately form the first upper clad layer 12a and the second upper clad layer 12b, and between these first and second upper clad layers 12a and 12b, the etching stopping mask 6b may be formed. At this time, the etching stopping mask has to be preliminarily removed at a portion located at the active layer among the portion mounting the optical element.

As set forth above, the device of the present invention consists of the optical waveguide forming layer of the lower clad layer, the core layer and the upper clad layer, removing a part of the optical waveguide forming layer, and optically coupling the optical element to the end face of the waveguide. In the optical waveguide forming layer, at least one thin film is inserted having a structure where a part of the thin film at the optical element mounting portion is removed. The remaining thin film portion serves as the etching stopping mask of the optical element mounting portion upon formation of the end face, to be coupled with the optical element of the optical waveguide, and can be used as a reference surface for alignment in the height direction. Furthermore, at the portion where the thin film is removed, the waveguide forming layer is removed by etching thereby exposing the surface of the substrate. Therefore, using material having high thermal conductivity, the substrate (as the heat sink) and the optical element are contacted. Thus, the position of the optical waveguide and the optical element in the height direction can be controlled with high precision, and heat radiation for the optical element, can be performed satisfactorily. Thus, stable mounting of the light emitting element becomes possible. Furthermore, since little fluctuation of alignment error in the wafer exists, it is significantly effective in mass-production of the optical coupling circuit.

While the foregoing embodiment is mainly directed to coupling between the light emitting element or light sensing element and the optical waveguide, application of the present invention should not be limited to the light emitting element or the light sensing element. For example, the optical waveguide device can include an $LiNbO_3$ substrate. This material has electro optic effect and piezoelectric effect, a light modulator, an optical switch may be applied as a function device. While the quartz waveguide has superior characteristics as the optical waveguide, but has no function which is achieved by the $LiNbO_3$. Therefore, it is quite attractive to use these in combination. Since the optical waveguide formed in the $LiNbO_3$ substrate is generally positioned in the vicinity of the surface of substrate, it can to be easily coupled by the present invention similar to the light emitting element and light sensing element.

What is claimed is:

1. An optical coupling circuit for optically coupling an optical element comprising:

an optical waveguide formed by patterning an optical waveguide forming layer having a lower clad layer, a core layer and an upper clad layer;

an optical element mounting portion formed by removing a portion of said optical waveguide forming layer; and at least one thin film inserted in said optical waveguide forming layer, a portion of said thin film being removed at said optical element mounting portion and a remaining portion being an etching stopper layer on which said optical element is mounted.

2. An optical coupling circuit as set forth in claim 1, wherein said optical waveguide forming layer is completely removed to expose a substrate, on which said optical waveguide forming layer is formed, at a portion where the thin film is removed at said optical element mounting portion.

3. An optical coupling circuit as set forth in claim 2, and including a member having a high electric conductivity or thermal conductivity in contact with the optical element mounted on the exposed surface of said substrate.

4. A fabrication process of an optical coupling circuit for optically coupling an optical element comprising the steps of:

forming an optical waveguide forming layer having a lower clad layer, a core layer and an upper clad layer, inserting at least one thin film in said optical waveguide forming layer and removing a portion of said thin film at an optical element mounting portion whereby to leave a remaining portion for serving as an etching stopper layer on which said optical element is mounted;

removing a portion of said optical waveguide forming layer at said optical element mounting portion to constitute an optical waveguide and said optical element mounting portion and expose the surface of said thin film; and exposing that part of the surface of the substrate where said thin film is removed.

5. A fabrication process as set forth in claim 4, wherein said thin film has an etching rate ratio greater than or equal to 10 times that of said waveguide forming layer.

* * * * *